(12) United States Patent
Millar et al.

(10) Patent No.: US 11,154,016 B2
(45) Date of Patent: Oct. 26, 2021

(54) SYSTEMS AND METHODS FOR MANAGING A WEIGHT OF A PLANT IN A GROW POD

(71) Applicant: Grow Solutions Tech LLC, Lehi, UT (US)

(72) Inventors: Gary Bret Millar, Highland, UT (US); Michael Stephen Hurst, Farmington, UT (US); Taylor John Woodbury, Provo, UT (US)

(73) Assignee: Grow Solutions Tech LLC, Vineyard, UT (US)

( * ) Notice: Subject to any disclaimer, the term of this patent is extended or adjusted under 35 U.S.C. 154(b) by 488 days.

(21) Appl. No.: 15/985,119

(22) Filed: May 21, 2018

(65) Prior Publication Data
US 2018/0359939 A1     Dec. 20, 2018

Related U.S. Application Data

(60) Provisional application No. 62/519,704, filed on Jun. 14, 2017.

(51) Int. Cl.
| | |
|---|---|
| *A01G 9/08* | (2006.01) |
| *A01G 31/04* | (2006.01) |
| *G01G 19/52* | (2006.01) |
| *G01G 11/00* | (2006.01) |
| *G01G 19/04* | (2006.01) |

(Continued)

(52) U.S. Cl.
CPC ............ *A01G 9/088* (2013.01); *A01G 9/085* (2013.01); *A01G 9/247* (2013.01); *A01G 31/042* (2013.01); *G01F 23/00* (2013.01); *G01G 11/003* (2013.01); *G01G 11/043* (2013.01); *G01G 19/042* (2013.01); *G01G 19/415* (2013.01);

(Continued)

(58) Field of Classification Search
CPC ... A01G 31/042; A01G 27/003; A01G 27/008
See application file for complete search history.

(56) References Cited

U.S. PATENT DOCUMENTS

| | | | | |
|---|---|---|---|---|
| 3,771,258 A | * | 11/1973 | Charney | ............. A01G 31/042 47/65 |
| 5,611,172 A | * | 3/1997 | Dugan | ..................... A01G 7/00 47/1.01 R |

(Continued)

FOREIGN PATENT DOCUMENTS

| | | |
|---|---|---|
| CN | 103493700 A | 1/2014 |
| EP | 2599381 A1 | 6/2013 |

(Continued)

OTHER PUBLICATIONS

International Search Report and Written Opinion dated Sep. 7, 2018 relating to International Application No. PCT/US2018/035037.

*Primary Examiner* — Magdalena Topolski
*Assistant Examiner* — Kevin M Dennis
(74) *Attorney, Agent, or Firm* — Dinsmore & Shohl LLP

(57) ABSTRACT

An assembly line grow pod includes a seeding region, a harvesting region, a track that extends between the seeding region and the harvesting region, a cart including a tray for holding plant matter, and a wheel coupled to the tray, where the wheel is engaged with the track, and a weight sensor positioned on the cart or the track, where the weight sensor is positioned to detect a weight of the plant matter positioned within the cart.

20 Claims, 7 Drawing Sheets

(51) Int. Cl.
*A01G 9/24* (2006.01)
*G01G 11/04* (2006.01)
*G01G 19/415* (2006.01)
*G01G 19/42* (2006.01)
*G01F 23/00* (2006.01)
*G01F 23/20* (2006.01)

(52) U.S. Cl.
CPC ............. *G01G 19/42* (2013.01); *G01G 19/52* (2013.01); *G01F 23/20* (2013.01)

(56) References Cited

U.S. PATENT DOCUMENTS

| | | | | |
|---|---|---|---|---|
| 6,295,865 | B1 * | 10/2001 | Cherry | A01G 27/008 |
| | | | | 73/73 |
| 8,584,397 | B1 * | 11/2013 | Marsh | A01G 27/005 |
| | | | | 47/48.5 |
| 9,681,611 | B2 | 6/2017 | Golgotiu et al. | |
| 9,775,290 | B2 | 10/2017 | Schleusner et al. | |
| 10,716,265 | B2 * | 7/2020 | Alexander | B25J 5/02 |
| 2002/0088176 | A1 * | 7/2002 | Gergek | A01G 27/06 |
| | | | | 47/79 |
| 2012/0260569 | A1 | 10/2012 | Golgotiu et al. | |
| 2015/0089867 | A1 * | 4/2015 | Abbott | H05B 47/16 |
| | | | | 47/58.1 LS |
| 2015/0223491 | A1 * | 8/2015 | Frampton | A01G 31/042 |
| | | | | 700/283 |
| 2015/0289460 | A1 * | 10/2015 | Vanderveken | A01G 27/003 |
| | | | | 47/66.7 |
| 2016/0302369 | A1 * | 10/2016 | Pickell | A01G 31/042 |
| 2017/0188526 | A1 | 7/2017 | De Fazio et al. | |
| 2017/0202163 | A1 * | 7/2017 | Aschheim | A01G 31/02 |
| 2018/0332775 | A1 * | 11/2018 | Kim | A01G 27/008 |
| 2019/0000019 | A1 * | 1/2019 | Alexander | A01G 9/02 |
| 2020/0100446 | A1 * | 4/2020 | Vogel | A01G 7/045 |

FOREIGN PATENT DOCUMENTS

| | | | | |
|---|---|---|---|---|
| GB | 2329029 | A | 3/1999 | |
| WO | WO-9941973 | A1 * | 8/1999 | ........... A01G 27/003 |
| WO | 2012042084 | A1 | 5/2012 | |
| WO | 2013065043 | A1 | 5/2013 | |
| WO | WO-2016023947 | A1 * | 2/2016 | ........... A01G 31/042 |
| WO | 2016049217 | A1 | 3/2016 | |
| WO | 2017042891 | A1 | 3/2017 | |

* cited by examiner

SYSTEMS AND METHODS FOR MANAGING A WEIGHT OF A PLANT IN A GROW POD

CROSS REFERENCE TO RELATED APPLICATIONS

This application claims the benefit of U.S. Provisional Application Ser. No. 62/519,704 filed on Jun. 14, 2017 and entitled "Systems and Methods for Managing a Weight of a Plant in a Grow Pod," the contents of which are hereby incorporated by reference in its entirety.

TECHNICAL FIELD

Embodiments described herein generally relate to systems and methods for managing a weight of plant matter in an assembly line grow pod and, more specifically, to managing a weight of plant matter in an assembly line grow pod by changing a recipe for the plant matter based at least in part on a measured weight of the plant.

BACKGROUND

While crop growth technologies have advanced over the years, there are still many problems in the farming and crop industry. As an example, while technological advances have increased efficiency and production of various crops, many factors may affect a harvest, such as weather, disease, infestation, and the like. Additionally, while the United States currently has suitable farmland to adequately provide food for the U.S. population, other countries and future populations may not have enough farmland to provide the appropriate amount of food.

Controlled environment growing systems may mitigate the factors affecting traditional harvests. In such controlled environment growing systems, it is desirable to monitor plant growth and to monitor the performance of different mechanisms and systems within the controlled environment growing system. Increases and/or fluctuations in the weights of plants may be indicative of plant growth and/or the performance of different mechanisms and systems within the controlled environment growing system.

SUMMARY

In one embodiment, an assembly line grow pod includes a seeding region, a harvesting region, a track that extends between the seeding region and the harvesting region, a cart including a tray for holding plant matter, and a wheel coupled to the tray, where the wheel is engaged with the track, and a weight sensor positioned on the cart or the track, where the weight sensor is positioned to detect a weight of the plant matter positioned within the cart.

In another embodiment, an assembly line grow pod system includes a track, a cart including a tray for holding plant matter, and a wheel coupled to the tray, where the wheel is engaged with the track, a weight sensor positioned on at least one of the cart or the track, where the weight sensor is positioned to detect a weight of the plant matter positioned within the cart, a watering system for dispensing a mixture to the plant matter positioned within the cart, and a controller communicatively coupled to the weight sensor, the controller including a processor and a computer readable and executable instruction set, which when executed, causes the processor to, receive an identification of a type of the plant matter positioned within the cart, determine a weight of the plant matter positioned within the cart with the weight sensor, retrieve a preferred weight for the plant matter positioned within the cart based at least in part on the received identification of the type of plant matter, compare the detected weight of the plant matter with the retrieved preferred weight, change a recipe for the plant matter positioned within the cart based at least in part on the comparison of the determined weight with the preferred weight, and direct the watering system to dispense a mixture according to the changed recipe to the plant matter positioned within the cart.

In yet another embodiment, a method for managing growth of plant matter in an assembly line grow pod includes moving a cart along a track, the cart including a tray and a wheel coupled to the tray, where the wheel is engaged with the track, detecting a weight of plant matter positioned within the tray with a weight sensor, where the weight sensor is positioned on one of the cart or the track, comparing the detected weight of the of the plant matter with a preferred weight of the plant matter, changing a recipe for the plant matter positioned in the cart, and dispensing a mixture based on the changed recipe to the plant matter with a watering system.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include assembly line grow pod systems and methods for managing a weight of plant matter in a grow pod. In embodiments, an assembly line grow pod includes a track, a cart supported on the track, a weight sensor configured to measure a weight of a payload on the cart, and a master controller. The master controller identifies plants in the cart, determines the total simulated days of growth for the cart, retrieves a preferred weight for the plants based on the total simulated days, compares the weight of the plants on the cart with the preferred weight, and changes a recipe for the plants based on the comparison.

As used herein, the term "plant matter" may encompass any type of plant and/or seed material at any stage of growth, for example and without limitation, seeds, germinating seeds, vegetative plants, and plants at a reproductive stage.

Figure 1:
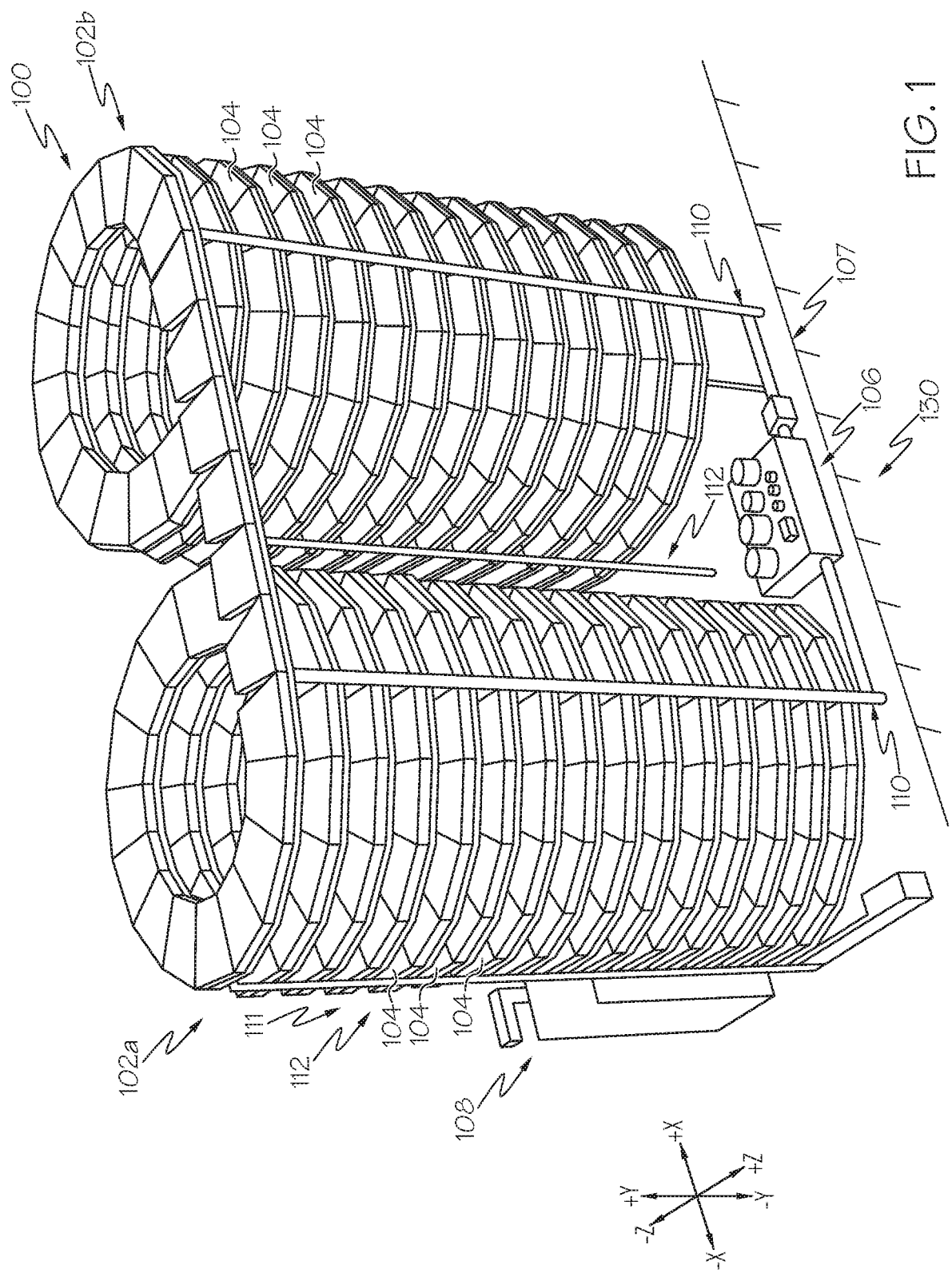
FIG. 1 schematically depicts an assembly line grow pod, according to one or more embodiments shown and described herein.
Figure 2:
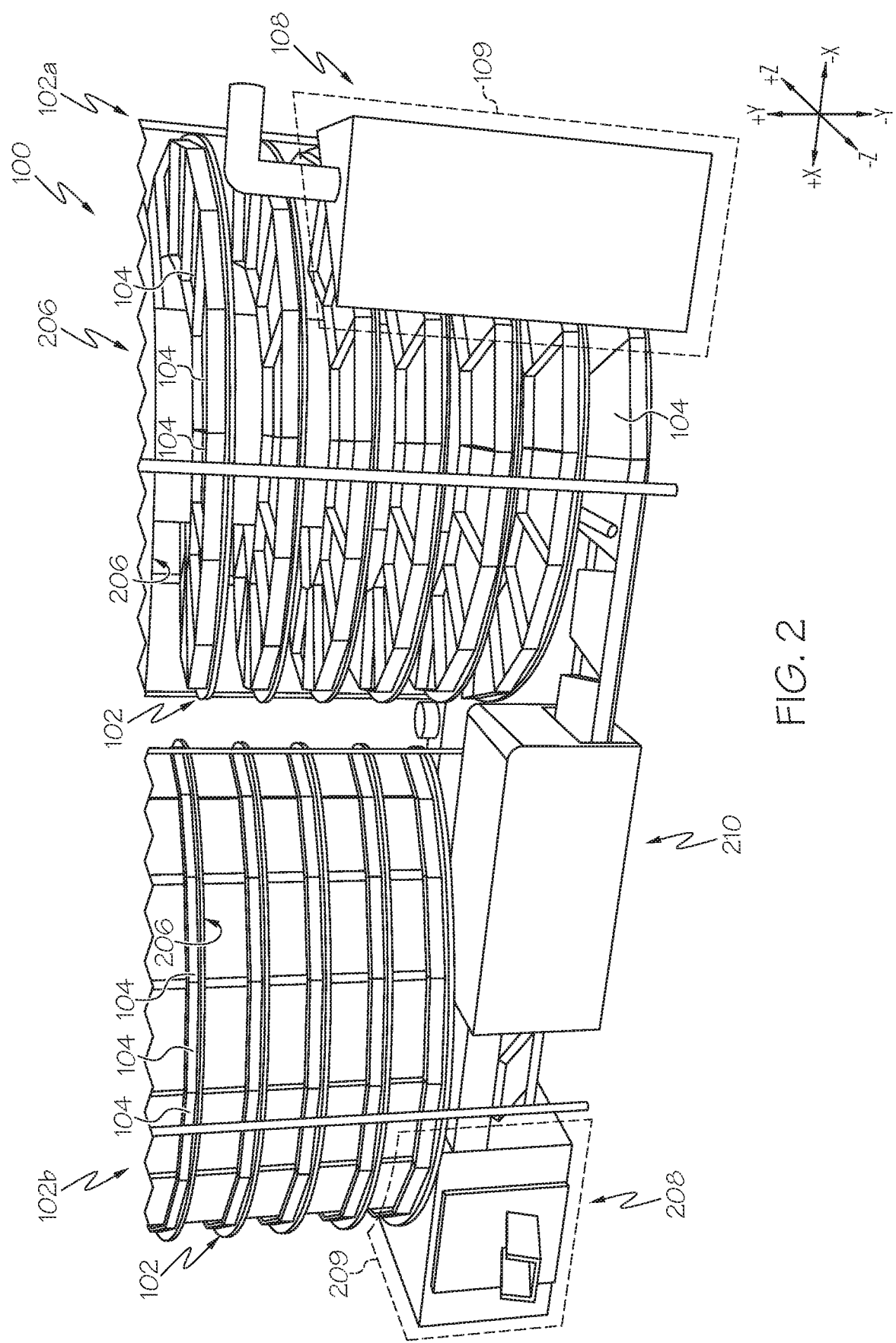
FIG. 2 schematically depicts a rear perspective view of the assembly line grow pod of FIG. 1, according to one or more embodiments shown and described herein.

Referring initially to FIGS. 1 and 2, a front perspective view and a rear perspective view of an assembly line grow pod 100 are depicted, respectively. The assembly line grow pod 100 includes a track 102 that is configured to allow one or more carts 104 to travel along the track 102. In the embodiment depicted in FIG. 1, the assembly line grow pod 100 includes an ascending portion 102a, a descending portion 102b, and a connection portion between the ascending portion 102a and the descending portion 102b. The track 102 at the ascending portion 102a moves upward in a vertical direction (i.e., in the +y-direction as depicted in the coordinate axes of FIG. 1), such that carts 104 moving along the track 102 move upward in the vertical direction as they travel along the ascending portion 102a. The track 102 at the ascending portion 102a may include curvature as depicted in FIG. 1, and may wrap around a first axis that is generally parallel to the y-axis depicted in the coordinate axes of FIG. 1, forming a spiral shape around the first axis. The track 102 at the descending portion 102b moves downward in the vertical direction (i.e., in the −y-direction as depicted in the coordinate axes of FIG. 1), such that carts 104 moving along the track 102 move downward in the vertical direction as they travel along descending portion 102b. The track 102 at the descending portion 102b may be curved, and may wrap around a second axis that is generally parallel to the y-axis depicted in the coordinate axes of FIG. 1, forming a spiral shape around the second axis. In some embodiments, such as the embodiment shown in FIG. 1, the ascending portion 102a and the descending portion 102b may generally form symmetric shapes and may be mirror-images of one another. In other embodiments, the ascending portion 102a and the descending portion 102b may include different shapes that ascend and descend in the vertical direction, respectively. The ascending portion 102a and the descending portion 102b may allow the track 102 to extend a relatively long distance while occupying a comparatively small footprint evaluated in the x-direction and the z-direction as depicted in the coordinate axes of FIG. 1, as compared to assembly line grow pods that do not include an ascending portion 102a and a descending portion 102b. Minimizing the footprint of the assembly line grow pod 100 may be advantageous in certain applications, such as when the assembly line grow pod 100 is positioned in a crowded urban center or in other locations in which space is limited.

Referring particularly to FIG. 2, an enlarged rear view of the assembly line grow pod 100 is depicted. In embodiments, the assembly line grow pod 100 generally includes a seeder system 108, a lighting system 206, a harvester system 208, and a sanitizer system 210. In the embodiment depicted in FIG. 2, the seeder system 108 is positioned on the ascending portion 102a of the assembly line grow pod 100 and defines a seeding region 109 of the assembly line grow pod 100. In embodiments, the harvester system 208 is positioned on the descending portion 102b of the assembly line grow pod 100 and defines a harvesting region 209 of the assembly line grow pod 100. In operation, carts 104 may initially pass through the seeding region 109, travel up the ascending portion 102a of the assembly line grow pod 100, down the descending portion 102b, and into the harvesting region 209.

The lighting system 206 includes one or more electromagnetic sources to provide light waves in one or more predetermined wavelengths that may facilitate plant growth. Electromagnetic sources of the lighting system 206 may generally be positioned on the underside of the track 102 such that the electromagnetic sources can illuminate plant matter in the carts 104 on the track 102. The assembly line grow pod 100 may also include one or more sensors positioned on the underside of the track 102 to detect growth and/or fruit output of plant matter positioned within carts 104 on the track 102, and the one or more sensors may assist in determining when plant matter positioned within the carts 104 is ready for harvest.

The harvester system 208 generally includes mechanisms suitable for removing and harvesting plant matter from carts 104 positioned on the track 102. For example, the harvester system 208 may include one or more blades, separators, or the like configured to harvest plant matter. In some embodiments, when a cart 104 enters the harvesting region 209, the harvester system 208 may cut plant matter within the cart 104 at a predetermined height. In some embodiments, a tray 105 (FIG. 3) of the cart 104 may be overturned to remove the plant matter within the cart 104 and into a processing container for chopping, mashing, juicing, etc. In some embodiments, plant matter may be grown in the carts 104 without the use of soil, such as by a hydroponic process or the like. As such, in such configurations, minimal or no washing of the plant matter may be necessary prior to processing at the harvester system 208. In some embodiments, the harvester system 208 may be configured to automatically separate fruit from plant matter within a cart 104, such as via shaking, combing, etc. If the remaining plant matter may be reused, plant matter remaining on the cart 104 after harvesting may remain on the cart 104 as the cart 104 to be reused in a subsequent growing process. If the plant matter is not to be reused, the plant matter within the cart 104 may be removed from the cart 104 for processing, disposal, or the like.

After the plant matter within the cart 104 is harvested by the harvester system 208, the cart 104 moves to the sanitizer system 210. In embodiments in which remaining plant matter in the cart 104 after harvesting is not to be reused, the sanitizer system 210 is configured to remove the plant matter and/or other particulate matter remaining on the cart 104. The sanitizer system 210 may include any one or combination of different washing mechanisms, and may apply high pressure water, high temperature water, and/or other solutions for cleaning the cart 104 as the cart 104 passes through the sanitizer system 210. Once the remaining particulate and/or plant matter is removed in the cart 104, the cart 104 moves into the seeding region 109, where the seeder system 108 deposits seeds within the cart 104 for a subsequent growing process, as described in greater detail herein.

Referring again to FIG. 1, in embodiments, the assembly line grow pod 100 includes a watering system 107 and an airflow system 111. The watering system 107 generally includes one or more water lines 110, which distribute water and/or nutrients to carts 104 at predetermined areas of the assembly line grow pod 100. For example, in the embodiment depicted in FIG. 1, the one or more water lines 110 extend up the ascending portion 102a and the descending portion 102b (e.g., generally in the +/−y-direction of the coordinate axes of FIG. 1) to distribute water and nutrients to plant matter within carts 104 on the track 102. The airflow system 111, as depicted in FIG. 1, includes one or more airflow lines 112 that extend throughout the assembly line grow pod 100. For example, the one or more airflow lines 112 may extend up the ascending portion 102a and the descending portion 102b (e.g., generally in the +/−y-direction of the coordinate axes of FIG. 1) to ensure appropriate airflow to plant matter positioned within the carts 104 on the track 102 of the assembly line grow pod 100. The airflow system 111 may assist in maintaining plant matter within the carts 104 on the track at an appropriate temperature and pressure, and may assist in maintaining appropriate levels of atmospheric gases within the assembly line grow pod 100 (e.g., carbon dioxide, oxygen, and nitrogen levels).

In embodiments, the assembly line grow pod 100 includes a master controller 106 that is communicatively coupled to one or more of the seeder system 108, the harvester system 208 (FIG. 2), the sanitizer system 210, the watering system 107, the lighting system 206 (FIG. 2), and the airflow system 111. In some embodiments, the master controller 106 may also be communicatively coupled to one or more sensors (not shown) positioned on the underside of the track 102 may detect the level of growth of plant matter within carts 104. The one or more sensors may be configured to detect whether the growth of plant matter within a specific cart 104 indicates that the plant matter is ready for harvesting before the cart 104 reaches the harvesting region 209 (FIG. 2). If the detected growth indicates that the plant matter within a cart 104 is ready for harvest, modifications to a recipe of nutrients, water, and/or light provided to the plant matter within that cart 104, such as by the watering system 107, the lighting system 206 (FIG. 2), and/or the airflow system 111, may be made until the cart 104 reaches the harvesting region 209. For example, the recipe of nutrients, water, and/or light provide to the plant matter within the cart 104 may be changed to maintain the plant matter at a certain stage of development ready that is ready for harvesting. Conversely, the detected growth of plant matter within the cart 104 indicates that the plant matter is not ready for harvesting when the cart 104 reaches the harvester system 208, the master controller 106 may command the cart 104 may to go on another lap through the assembly line grow pod 100 (i.e., up the ascending portion 102a, and down the descending portion 102b). This additional lap may include a different dosing of light, water, nutrients, etc. and the speed of the cart 104 could change, based on the development of the plant matter on the cart 104. If it is determined that the plant matter on a cart 104 is ready for harvesting, the harvester system 208 may remove the plant matter from the cart 104 and cut or otherwise process the plant matter in a harvesting process.

Figure 3:
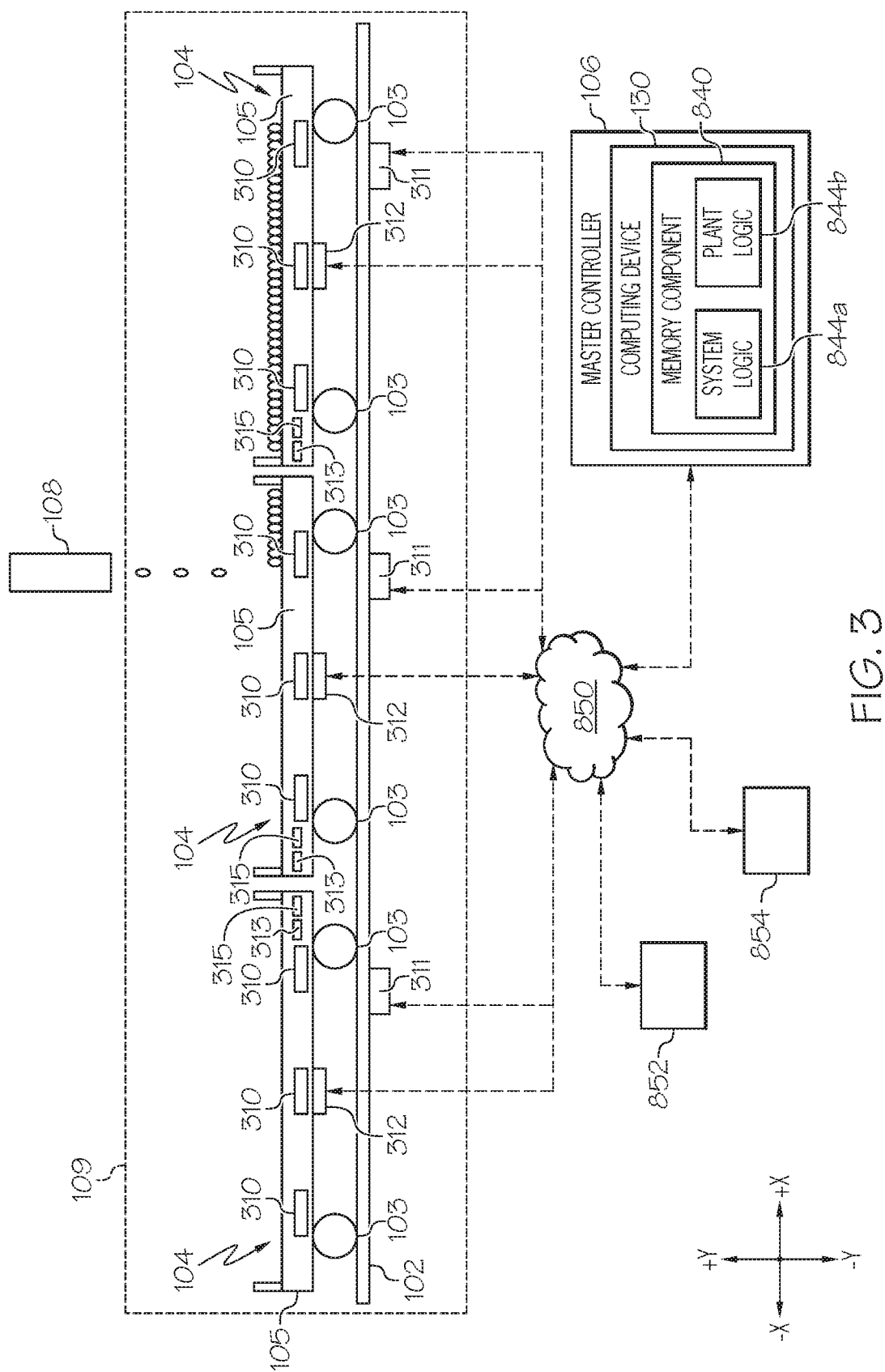
FIG. 3 schematically depicts a side view of a plurality of carts on a track of the assembly line grow pod of FIG. 1, according to embodiments described herein.

Referring collectively to FIGS. 1 and 3, the seeder system 108 is communicatively coupled to the master controller 106. The seeder system 108 is configured dispense seeds to one or more carts 104 as the carts 104 pass through the seeding region 109 of the assembly line grow pod 100. In some embodiments, each of the carts 104 include a single section tray 105 for receiving a plurality of seeds. In other embodiments one or more of the carts 104 may include a multiple section tray 105 for receiving individual seeds in each section. In the embodiments with a single section tray 105, upon a cart 104 entering the seeding region 109, the seeder system 108 may begin laying seed across an area of the single section tray 105. The seeds may be laid out according to various criteria, such as a desired depth of seed, a desired number of seeds, a desired surface area of seeds, or the like. In some embodiments, the seeds may be pre-treated with nutrients and/or anti-buoyancy agents, as these embodiments may not utilize soil to grow the seeds. In the embodiments where a multiple section tray 104 is utilized with one or more of the carts 104, the seeder system 108 may be configured to individually insert seeds into one or more of the sections of the tray. Again, the seeds may be distributed on the tray according to a desired number of seeds, a desired area the seeds should cover, a desired depth of seeds, etc.

Referring particularly to FIG. 3, a plurality of carts 104 are depicted moving through the seeding region 109. Each of the carts 104 generally include a tray 105 and a wheel 103 or wheels 103 that are coupled to the tray 105. The wheels 103 are rotatably coupled to the trays 105 and are engaged with and/or engagable with the track 102 such that the carts 104 move along the track 102 in +x direction as depicted in the coordinate axes of FIG. 3. In embodiments, the trays 105 are generally configured to hold plant matter.

The carts 104 include weight sensors 310 that are configured to detect a weight of plant matter held within the trays 105 of the carts 104. In the embodiment depicted in FIG. 3, the weight sensors 310 are positioned in the trays 105 of the separate carts 104, and each of the carts 104 include multiple weight sensors 310. In embodiments in which the carts 104 include multiple weight sensors 310, the weight sensors 310 may be positioned at different positions within the tray 105, such that each of the weight sensors 310 may detect the weight of plant matter at different positions within the tray 105. In some applications, it may be desirable to grow different types of plant matter within a single tray 105, such as in instances where the trays 105 include different and discrete sections. In these applications, the different weight sensors 310 may be configured to detect the weights of the different types of plant matter at different positions within the tray 105. While the embodiment depicted in FIG. 3 shows carts 104 including multiple weight sensors, it should be understood that each of the carts 104 may include a single weight sensor 310, or may optionally not include any weight sensors 310.

Each of the carts 104 further include a cart computing device 312. The cart computing devices 312 may be communicatively coupled to the weight sensors 310 and are configured to receive signals indicative of a detected weight from the weight sensors 310. The cart computing devices 312 may also be communicatively coupled to the master controller 106 through a network 850.

In some embodiments, one or more weight sensors 311 may be placed on or beneath or on the track 102. The weight sensors 311 are configured to measure the weights of the carts 104 on the track 102 and transmit signals indicative of a detected weight to the master controller 106. In embodiments, the master controller 106 may determine the weight of plant matter on a cart 104 based on a detected weight from the weight sensors 311 and a known weight of the cart 104 (i.e., the weight of the cart 104 without plant matter).

Still referring to FIG. 3, the carts 104 may optionally include additional sensors, such as environmental sensors 313 and position sensors 315, in embodiments. The environmental sensors 313 may include one or more sensors configured to detect moisture within the cart 104, a water level within the cart 104 (such as when the assembly line grow pod 100 utilizes a hydroponic growing process), or the like. The amount of water within the cart 104 may affect the weight detected by the weight sensors 311 and the weight sensors 310. Accordingly, understanding the amount of water within a cart 104, as indicated by a water level within the cart 104, may be useful in determining the weight of plant matter within the cart 104 as detected by the weight sensors 311 and the weight sensors 310. The environmental sensors 313 are communicatively coupled to the master controller 160 and may send signals indicative of the growing environment of the cart 104. The position sensors 315 may include one or more sensors configured to detect a position and/or a speed of the cart 104, such as a global positioning sensor or the like. The position sensors 315 are communicatively coupled to the master controller 106, and may send signals indicative of the position of the cart 104 within the assembly line grow pod 100 and/or the speed at which the cart 104 is moving within the assembly line grow pod 100. The position and the speed of travel of the cart 104 within the grow pod 100 may be indicative of the elapsed time in which the cart 104 has been growing plant matter within the assembly line grow pod 100, and accordingly, may be used to monitor the progress of the growth of plant matter within the cart 104. Additionally, in some embodiments, the position sensors 315 may detect when the cart is at different positions on the track 102, and the weight sensors 310 may detect the weight of plant matter in the cart 104 at the different positions on the track 102. For example, a position sensor 315 may detect when the cart 104 is at a first position on the track 102, such as at the ascending portion 102a (FIG. 1), and the weight sensor and/or weight sensors 310 may detect the weight of the plant matter in the cart at the first position. The position sensor 315 may detect when the cart is at a second position on the track that is downstream of the first position, such as at the descending portion 102b (FIG. 1), and the weight sensor and/or weight sensors 310 may detect the weight of the plant matter in the cart at the second position. By comparing the detected weight of the plant matter at the first position and the second position, growth of plant matter in a particular cart 104 may be monitored.

The master controller 106 may include a computing device 130. The computing device 130 may include a memory component 840, which stores systems logic 844a and plant logic 844b. As described in more detail below, the systems logic 844a may monitor and control operations of one or more of the components of the assembly line grow pod 100. For example, the systems logic 844a may monitor and control operations of the lighting system 206 (FIG. 2), the watering system 107, the airflow system 111, the harvester system 208 (FIG. 2), the sanitizer system 210 (FIG. 2), and the seeder system 108. The plant logic 844b may be configured to determine and/or receive a stored recipe for plant growth and may facilitate implementation of the recipe via the systems logic 844a. In some embodiments, detected weights of plant matter may be stored in the plant logic 844b to determine trends in the detected weight of the plant matter, and the determined or stored recipe for plant growth may be based at least in part on the determined trend. For example, if the determined trend based on detected weights of plant matter indicates that the plant matter is consistently below a desired plant weight, the stored recipe for that particular type of plant matter may be changed to increase plant growth in future grow cycles.

The master controller 106 is coupled to a network 850. The network 850 may include the internet or other wide area network, a local network, such as a local area network, a near field network, such as Bluetooth or a near field communication (NFC) network. The network 850 is also coupled to a user computing device 852 and/or a remote computing device 854. The user computing device 852 may include a personal computer, laptop, mobile device, tablet, phablet, mobile device, or the like and may be utilized as an interface with a user. As an example, a detected weight of seeds within each of the carts 104 may be transmitted to the user computing device 852, and a display of the user computing device 852 may display the weight for each of the carts. The user computing device 852 may also receive input from a user, for example, the user computing device 852 may receive an input indicative of a type of seeds to be placed in the carts 104 by the seeder system 108.

Similarly, the remote computing device 854 may include a server, personal computer, tablet, phablet, mobile device, server, or the like, and may be utilized for machine to machine communications. As an example, if the master controller 106 determines a type of seeds being used (and/or other information, such as ambient conditions), the master controller 106 may communicate with the remote computing device 854 to retrieve a previously stored recipe (i.e., predetermined preferred growing conditions, such as water/nutrient requirements, lighting requirements, temperature requirements, humidity requirements, or the like). As such, some embodiments may utilize an application program interface (API) to facilitate this or other computer-to-computer communications.

Figure 4:
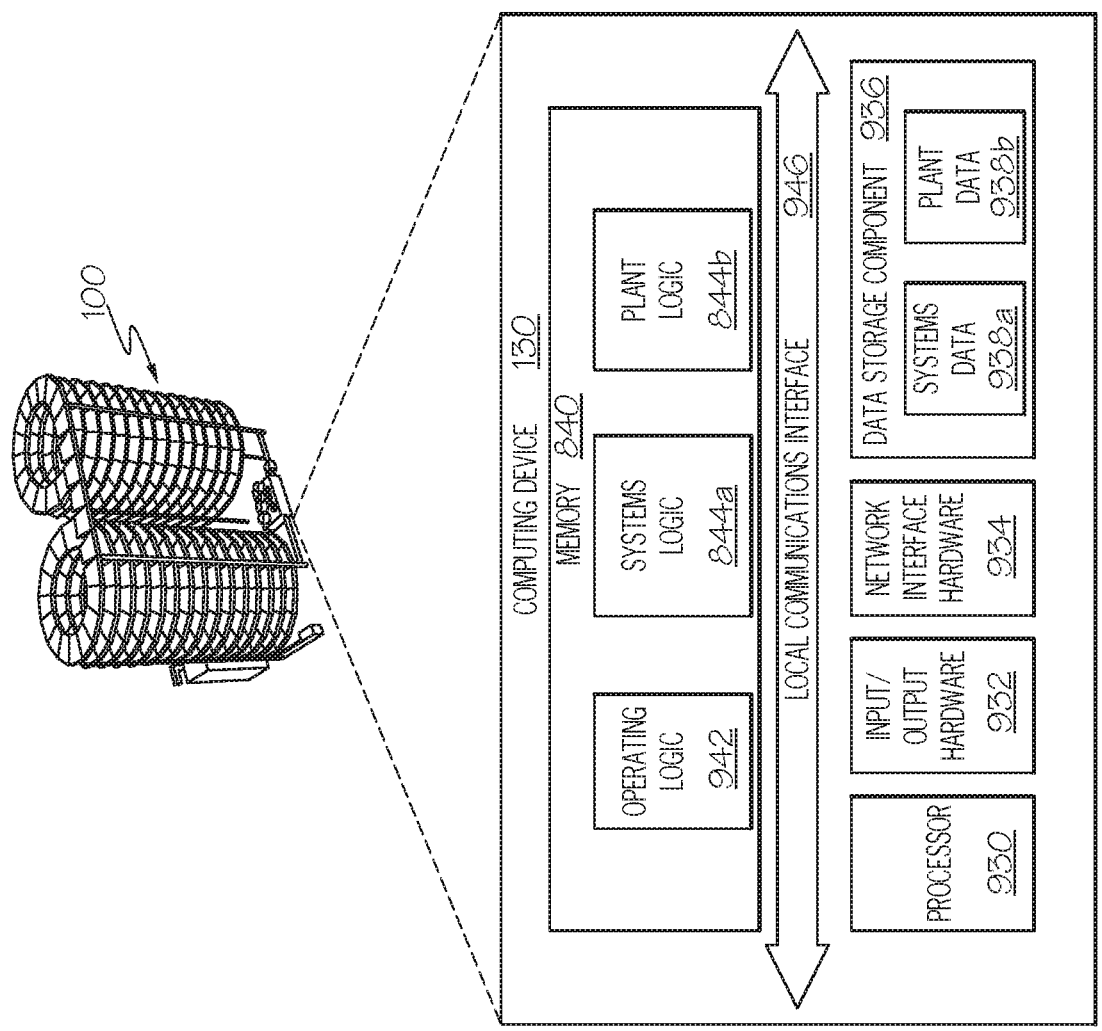
FIG. 4 schematically depicts a computing device for use in the assembly line grow pod of FIG. 1, according to one or more embodiments shown and described herein.

FIG. 4 depicts the computing device 130 of the master controller 160, according to embodiments described herein. As illustrated, the computing device 130 includes a processor 930, input/output hardware 932, the network interface hardware 934, a data storage component 936 (which stores systems data 938a, plant data 938b, and/or other data), and the memory component 840. The memory component 840 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), bernoulli cartridges, and/or other types of non-transitory computer-readable mediums. Depending on the particular embodiment, these non-transitory computer-readable mediums may reside within the computing device 130 and/or external to the computing device 130.

The memory component 840 may store operating logic 942, the systems logic 844a, and the plant logic 844b. The systems logic 844a and the plant logic 844b may each include a plurality of different pieces of logic, each of which may be embodied as a computer program, firmware, and/or hardware, as an example. The computing device 130 further includes a local interface 946 that may be implemented as a bus or other communication interface to facilitate communication among the components of the computing device 130.

The processor 930 may include any processing component operable to receive and execute instructions (such as from a data storage component 936 and/or the memory component 840). The input/output hardware 932 may include and/or be configured to interface with microphones, speakers, a display, and/or other hardware.

The network interface hardware 934 may include and/or be configured for communicating with any wired or wireless networking hardware, including an antenna, a modem, LAN port, wireless fidelity (Wi-Fi) card, WiMax card, ZigBee card, Bluetooth chip, USB card, mobile communications hardware, and/or other hardware for communicating with other networks and/or devices. From this connection, communication may be facilitated between the computing device 130 and other computing devices, such as the user computing device 852 and/or remote computing device 854.

The operating logic 942 may include an operating system and/or other software for managing components of the computing device 130. As also discussed above, systems logic 844a and the plant logic 844b may reside in the memory component 840 and may be configured to perform the functionality, as described herein.

It should be understood that while the components in FIG. 4 are illustrated as residing within the computing device 130, this is merely an example. In some embodiments, one or more of the components may reside external to the computing device 130. It should also be understood that, while the computing device 130 is illustrated as a single device, this is also merely an example. In some embodiments, the systems logic 844a and the plant logic 844b may reside on different computing devices. As an example, one or more of the functionalities and/or components described herein may be provided by the user computing device 852 and/or remote computing device 854.

Additionally, while the computing device 130 is illustrated with the systems logic 844a and the plant logic 844b as separate logical components, this is also an example. In some embodiments, a single piece of logic (and/or or several linked modules) may cause the computing device 130 to provide the described functionality.

As described below, detected weights from the weight sensors 310 and the weight sensors 311 may be utilized by the master controller 160 to verify the operation of various components of the assembly line grow pod 100 and may change growing conditions for plant matter in the carts 104.

Figure 5:
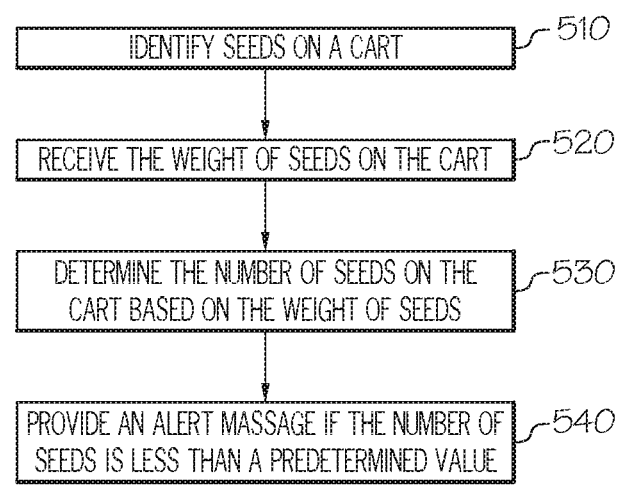
FIG. 5 schematically depicts a flowchart for determining the number of seeds in a cart based at least in part on a detected weight of seeds, according to one or more embodiments shown and described herein.

FIG. 5 depicts a flowchart for determining the number of seeds in a cart 104 (FIG. 3) based on a detected weight of the seeds within the cart 104, according to embodiments described herein. At block 510, the master controller 106 (FIG. 3) identifies a type of seeds on a cart 104 (FIG. 3). For example, the master controller 106 (FIG. 3) may receive a user input indicating the type of seeds that need to be grown in the carts through the user computing device 852 (FIG. 3), and the master controller 106 (FIG. 3) receives the input type of seeds from the user computing device 852. As another example, one or more sensors in communication with the master controller 106 (FIG. 3) may provide a signal to the master controller 106 indicative of the type of seeds positioned within the seeder system 108 (FIG. 3).

At block 520, the master controller 106 (FIG. 3) receives a signal indicative of the detected weight of plant matter (i.e., the seeds) on the cart 104 (FIG. 3). For example, the weight sensors 310 and/or the weight sensors 311 detect a weight of the plant matter on the cart 104, as depicted in FIG. 3, and transmit a signal indicative of the detected weight to the master controller 106 through the network 850.

At block 530, the master controller 106 (FIG. 3) determines the number of seeds on the cart based at least in part on the detected weight of seeds. For example, the master controller 106 (FIG. 3) may retrieve an average weight of a seed of the type positioned in the cart 104 from the plant logic 844b (FIG. 3) based on the identified seed type, and divide the detected weight of the plant matter in the cart 104 (FIG. 3) by the average weight to obtain the number of seeds on the cart 104.

At block 540, the master controller 106 (FIG. 3) provides an alert message if the number of seeds in the cart is less than a predetermined value. The predetermined value may be the number of the seeds to be seeded per cart. For example, if the number of seeds in the cart 104 (FIG. 3) is 300 and the predetermined value is 500, the master controller 106 (FIG. 3) may transmit an alert message to the user computing device 852 (FIG. 3) for notifying that the cart 104 (FIG. 3) is not fully loaded with seeds, which may be indicative of an issue with the seeder system 108 (FIG. 3). In this way, the weight sensors 310 (FIG. 3) and the weight sensors 311 (FIG. 3) may assist in identifying operating issues with the seeder system 108 (FIG. 3).

Figure 6:
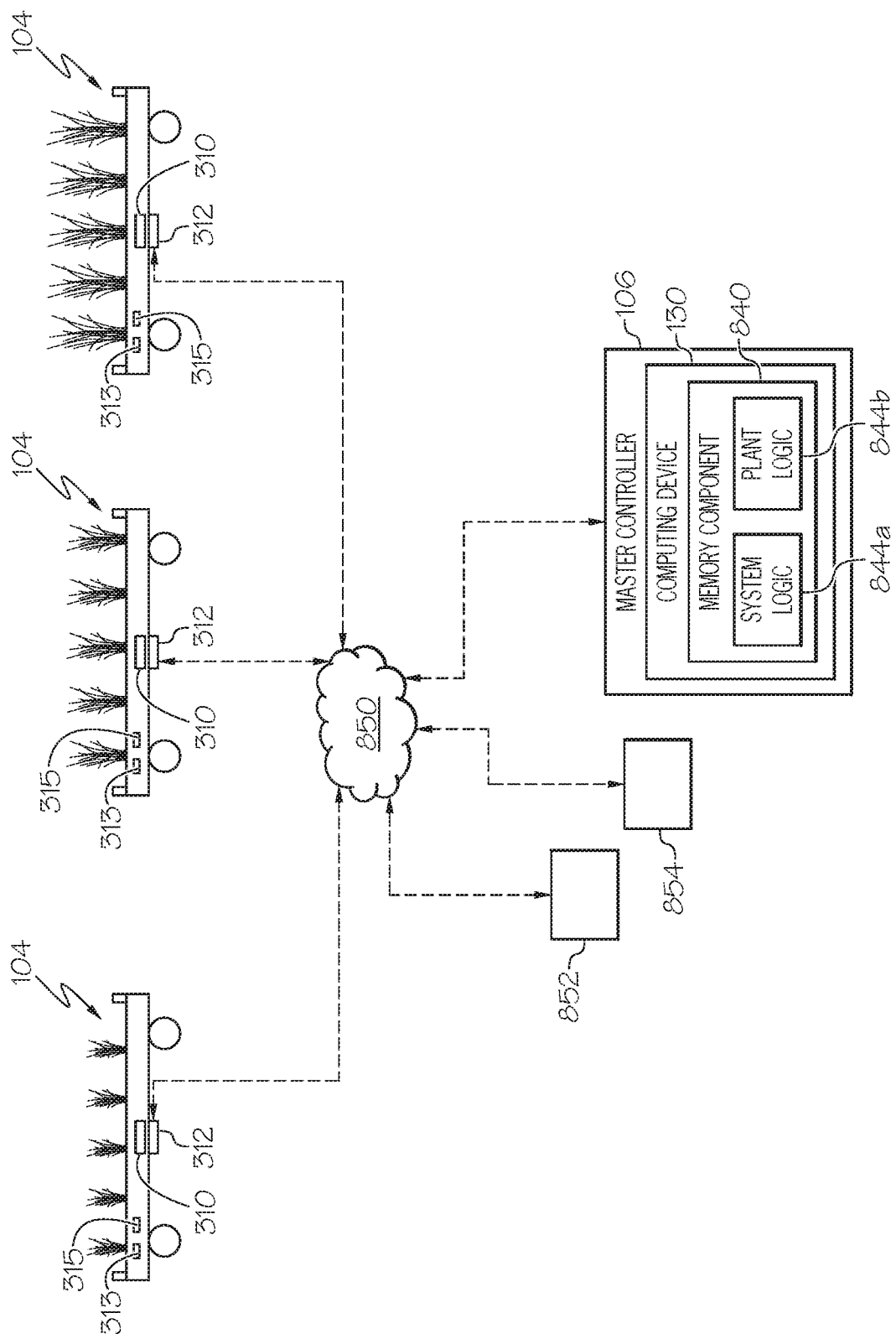
FIG. 6 schematically depicts a plurality of carts of the assembly line grow pod of FIG. 1 with plant matter at different stages of growth, according to one or more embodiments shown and described herein.

Referring now to FIG. 6, a plurality of carts 104 having weight sensors 310 are depicted carrying plant matter at different stages of growth, according to embodiments described herein. For example, the carts 104 may be positioned at different locations on the track 102 (FIG. 1) and the plant matter in each of the carts 104 may have experienced different elapsed grow times (i.e., a different time elapsed from when seed have been deposited within the carts 104). Without being bound by theory, as plant matter within the carts 104 grows, the mass of the plant matter will increase, and accordingly a weight detected by the weight sensors 310 may increase. As the plant matter within the carts 104 grows, a weight detected by the weight sensors may be indicative of the progress of the growth, and the detected weight may be utilized to change and optimize growing conditions for the cart 104.

Figure 7:
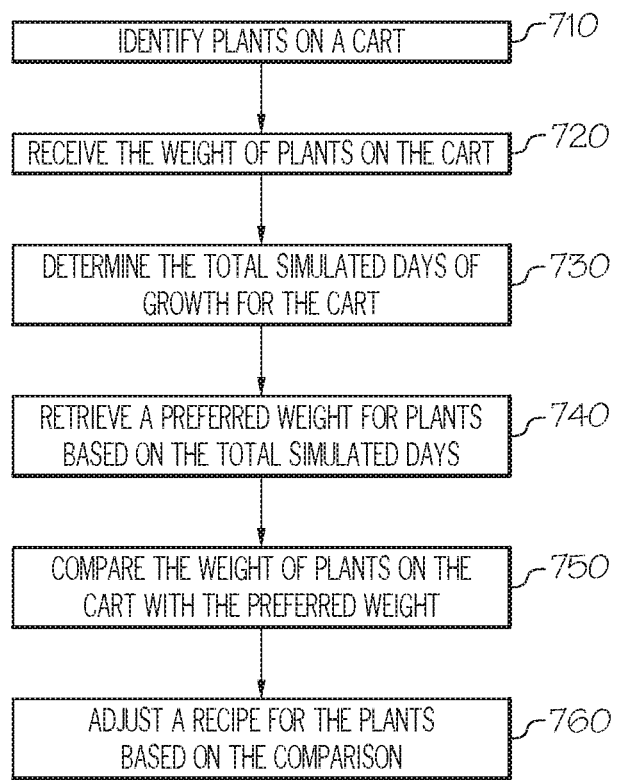
FIG. 7 schematically depicts a flowchart for changing a recipe for plant matter based at least in part on a detected weight of the plant matter, according to one or more embodiments shown and described herein.

For example and referring to collectively to FIGS. 6 and 7, carts 104 and a flowchart for changing a recipe (i.e., predetermined preferred growing conditions, such as water/nutrient requirements, lighting requirements, temperature requirements, humidity requirements, or the like) for plant matter based at least in part on a detected weight of plant matter in a cart 104 is depicted, respectively, according to embodiments described herein. At block 710, the master controller 106 receives a signal indicative of a type of plant matter positioned on the cart 104. For example, the user computing device 852 may receive a user input indicative of a type of plant matter to be grown in a cart 104, and the master controller 106 receives the type of plant matter from the user computing device 852. As another example, the master controller 106 may obtain identification of plants positioned within the cart 104 from the seeder system 108 (FIG. 3) that seeds the plants in the carts 104. In some embodiments, one or more sensors positioned on the assembly line grow pod 100 may detect the type of plant matter grown in the cart 104, and may send a signal indicative of the detected type of plant matter within the cart 104 to the master controller 106. In some embodiments, such as when the cart 104 includes different types of plant matter positioned at different positions of the cart 104, the master controller 106 may obtain identification for each of the different types of plant matter within the cart. For example, the master controller 106 may obtain a first identification of plant matter positioned within a first portion of the cart 104, and a separate second identification of plant matter positioned within a second portion of the cart 104.

At block 720, the master controller 106 receives a signal indicative of a detected weight of plant matter on the cart 104 from the weight sensors 310 and/or the weight sensors 311. In some embodiments, the master controller 106 may communicate with the environmental sensor 313 and calculate the weight of water and/or other additives positioned within the cart. The master controller 106 may calculate the actual weight of the plant matter by subtracting the detected weight of water and/or other additives from the detected weight from the weight sensors 310/311.

At block 730, the master controller 106 determines the elapsed grow time of the cart. In some embodiments, the master controller 106 may determine the simulated days of growth for plants on a cart based on the detected current position of the cart on the track 102, such as from the position sensors 315. For example, in a growing configuration in which the carts 104 are intended to traverse the length of the track 102 (i.e. the distance between the seeding region 109 and the harvesting region 209) in 6 days, if the detected position of the cart 104 indicates the cart 104 has travelled a distance more than ⅚ of the total distance of the track 102, the master controller 106 determines that the plant in the cart 104 is in day 5 of growth. As another example, if the detected position of the cart 104 indicates that the cart 104 has travelled a distance more than ⅗ of the total distance but less than ⅘ of the total distance of the track 102, the master controller 106 determines that the plant in the cart 104 is in day 3 of growth.

At block 740, the master controller 106 retrieves a preferred weight for plant matter positioned within the cart based on the elapsed grow time. For example, the plant logic 844b may store a preferred weight for the plant matter in day 5 of growth and the master controller 106 retrieves the preferred weight for the plant matter from the plant logic 844b. In some embodiments, such as when the cart 104 includes different types of plant matter positioned at different positions of the cart 104, the master controller 106 may retrieve preferred weights for each of the different types of plant matter positioned within the cart 104. For example, the master controller 106 may retrieve a first preferred weight for the first plant matter positioned within the first portion of the cart 104, and a separate second preferred weight for the second plant matter positioned within the second portion of the cart 104.

At block 750, the master controller 106 compares the detected weight of the plant matter on the cart with the retrieved preferred weight. At block 660, the master controller 106 changes a recipe for the plants based on the comparison. In embodiments, if the detected weight of the plant matter in the cart 104 is lower than the preferred weight, then the master controller 106 may adjust elements of the recipe for the plants (e.g., lighting, nutrients, temperature, pressure, etc.) to induce further growth. For example, the master controller 106 may increase the red light level of the lighting recipe for the plant matter for further growth of the plant matter that passes along the track 102 of the assembly line grow pod 100. As another example, the master controller 106 may increase a nutrient mixture provided to the cart 104, such as through the watering system 107 (FIG. 1). In some embodiments, such as when the cart 104 includes different types of plant matter positioned at different positions of the cart 104, the master controller 106 may change (or not change) the recipe for the different types of plant matter within the cart 104. For example, the master controller 106 may change a recipe for the first plant matter positioned within the first portion of the cart 104, may make the same or different changes to a recipe fo the second plant matter positioned within the second portion of the cart 104.

As illustrated above, various embodiments for managing a weight of a plant in a grow pod are disclosed. These embodiments create a quick growing, small footprint, chemical free, low labor solution to growing microgreens and other plants for harvesting. These embodiments may create recipes and/or receive recipes that dictate the timing and wavelength of light, pressure, temperature, watering, nutrients, molecular atmosphere, and/or other variables the optimize plant growth and output. The recipe may be implemented strictly and/or modified based on results of a particular plant, tray, or crop.

Accordingly, embodiments according to the present disclosure include an assembly line grow pod that includes a cart positioned on a track, and a weight sensor configured to measure a weight of plant matter positioned within the cart. The weight detected by the weight sensor may be utilized to detect the operation of seeding systems of the assembly line grow pod, and may be used to change growing conditions for the plant matter within the cart in real-time, changing lighting, nutrients, and water provided to the plant matter.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for managing a weight of a plant. It should also be understood that these embodiments are merely exemplary and are not intended to limit the scope of this disclosure.

What is claimed is:

1. An assembly line grow pod comprising: a seeder system within a seeding region, wherein the seeder system is configured to dispense seeds; a harvester system within a harvesting region, wherein the harvester system is configured to harvest plant matter; an ascending portion that moves upward in a vertical direction and a descending portion that moves downward in the vertical direction, wherein the ascending portion and the descending portion are positioned between the seeding region and the harvesting region; a track that extends between the seeding region and the harvesting region; a cart comprising: a tray for holding the plant matter; and a wheel coupled to the tray, wherein the wheel is engaged with the track; a weight sensor positioned on the cart or the track, where the weight sensor is positioned to detect a weight of the plant matter positioned within the cart; and a controller communicatively coupled to the weight sensor, the controller comprising a processor and a computer readable and executable instruction set, which when executed, causes the processor to: determine the weight of the plant matter positioned within the cart with the weight sensor; retrieve a preferred weight for the plant matter positioned within the cart; compare the determined weight of the plant matter with the retrieved preferred weight; and change a recipe for the plant matter positioned within the cart based at least in part on the comparison of the determined weight with the preferred weight, wherein the recipe for the plant matter comprises water and nutrient requirements, lighting requirements, and temperature requirements for the plant matter.

2. The assembly line grow pod of claim 1, wherein the weight sensor is positioned on the tray of the cart.

3. The assembly line grow pod of claim 2, wherein the weight sensor is a first weight sensor, and the assembly line grow pod further comprises a second weight sensor positioned on the cart or the track.

4. The assembly line grow pod of claim 1, further comprising an environmental sensor positioned in the tray of the cart, wherein the environmental sensor detects a level of water in the tray of the cart.

5. The assembly line grow pod of claim 4, wherein the environmental sensor and the weight sensor are communicatively coupled to a master controller.

6. An assembly line grow pod system comprising: a track; a seeder system within a seeding region, wherein the seeder system is configured to dispense seeds; a harvester system within a harvesting region, wherein the harvester system is configured to harvest plant matter; an ascending portion that moves upward in a vertical direction and a descending portion that moves downward in the vertical direction, wherein the ascending portion and the descending portion are positioned between the seeding region and the harvesting region; a cart comprising: a tray for holding the plant matter; and a wheel coupled to the tray, wherein the wheel is engaged with the track; a weight sensor positioned on at least one of the cart or the track, where the weight sensor is positioned to detect a weight of the plant matter positioned within the cart; a watering system for dispensing a mixture to the plant matter positioned within the cart; and a controller communicatively coupled to the weight sensor, the controller comprising a processor and a computer readable and executable instruction set, which when executed, causes the processor to: receive an identification of a type of the plant matter positioned within the cart; determine the weight of the plant matter positioned within the cart with the weight sensor; retrieve a preferred weight for the plant matter positioned within the cart based at least in part on the received identification of the type of plant matter; compare the determined weight of the plant matter with the retrieved preferred weight; change a recipe for the plant matter positioned within the cart based at least in part on the comparison of the determined weight with the preferred weight, wherein the recipe for the plant matter comprises water and nutrient requirements, lighting requirements, and temperature requirements for the plant matter; and direct the watering system to dispense the mixture according to the changed recipe to the plant matter positioned within the cart.

7. The assembly line grow pod system of claim 6, wherein the weight sensor is a first weight sensor positioned on the tray of the cart, and the assembly line grow pod system further comprises a second weight sensor positioned on the cart or the track.

8. The assembly line grow pod system of claim 7, wherein:
the second weight sensor is positioned on the tray of the cart at a position that is different than the first weight sensor; and
the executable instruction set, when executed, further causes the processor to determine a first weight of plant matter positioned at a first portion of the tray with the first weight sensor and to determine a second weight of plant matter positioned at a second portion of the tray with the second weight sensor.

9. The assembly line grow pod system of claim 8, wherein the executable instruction set, when executed, further causes the processor to:
receive a first identification of a type of plant matter positioned within the first portion of the cart;
receive a second identification of a type of plant matter positioned within the second portion of the cart;
retrieve a first preferred weight for the plant matter positioned within the first portion of the cart based at least in part on the received first identification of the type of plant matter;
retrieve a second preferred weight for the plant matter positioned within the second portion of the cart based at least in part on the received second identification of the type of plant matter;
compare the first determined weight of the plant matter positioned within the first portion of the cart with the first preferred weight;
compare the second determined weight of the plant matter positioned within the second portion of the cart with the second preferred weight;
change a recipe for at least one of the plant matter positioned within the first portion of the cart and the plant matter positioned within the second portion of the cart based at least in part on the comparison of the first and second determined weights of the plant matter positioned in the first portion and the second portion of the cart with the first preferred weight and the second preferred weight; and
direct the watering system to dispense the changed recipe to the plant matter positioned within the at least one of the first portion of the cart and the second portion of the cart.

10. The assembly line grow pod system of claim 6, wherein the executable instruction set, when executed, further causes the processor to:
detect a weight of the cart with the weight sensor;
retrieve a known weight of the cart; and
determine the weight of the plant matter within the cart based at least in part on the detected weight of the cart and the known weight of the cart.

11. The assembly line grow pod system of claim 6, wherein the executable instruction set, when executed, further causes the processor to:
detect a water level in the cart with an environmental sensor;
determine the weight of the plant matter within the cart based at least in part on the detected water level in the cart.

12. The assembly line grow pod of claim 6, wherein the executable instruction set, when executed, further causes the processor to:
determine when the cart is at a first position on the track;
determine the weight of the plant matter within the cart when the cart is at the first position on the track;
determine when the cart is at a second position on the track that is different than the first position; and
determine the weight of the plant matter within the cart at the second position.

13. The assembly line grow pod of claim 6, wherein the executable instruction set, when executed, further causes the processor to:
store determined weights of the plant matter;
determine a trend of determined weights of the plant matter; and
change a stored recipe for the plant matter positioned within the cart based at least in part on the trend of determined weights.

14. A method for managing growth of plant matter in an assembly line grow pod, the method comprising: moving a cart along a track, the cart comprising a tray and a wheel coupled to the tray, wherein the wheel is engaged with the track; moving the cart up an ascending portion that moves upward in a vertical direction and down a descending portion that moves downward in the vertical direction, wherein the ascending portion and the descending portion are positioned between a seeding region and a harvesting region; detecting a weight of plant matter positioned within the tray with a weight sensor, wherein the weight sensor is positioned on one of the cart or the track; comparing the detected weight of the of the plant matter with a preferred weight of the plant matter; changing a recipe for the plant matter positioned in the cart based at least in part on the comparison of the detected weight with the preferred weight, wherein the recipe for the plant matter comprises water and nutrient requirements, lighting requirements, and temperature requirements for the plant matter; and dispensing a mixture based on the changed recipe to the plant matter with a watering system; harvesting the plant matter with a harvester system within the harvesting region; and dispensing a plurality of seeds to the cart with a seeder system within the seeding region.

15. The method of claim 14, wherein detecting the weight of the plant matter comprises detecting a weight of the cart and determining the weight of the plant matter based at least in part on the detected weight of the cart and a known weight of the cart.

16. The method of claim 14, further comprising
detecting a water level in the cart with an environmental sensor;
determining the weight of the plant matter within the cart based at least in part on the detected water level in the cart.

17. The method of claim 14, wherein the preferred weight of the plant matter is based at least in part on an elapsed grow time of the plant matter within the cart.

18. The method of claim 17, further comprising detecting a distance traveled by the cart along the track and determining the elapsed grow time based at least in part on the detected distance traveled by the cart.

19. The method of claim 14, further comprising: depositing the plurality of seeds into the cart; detecting a weight of the plurality of seeds within the cart; and determining a number of seeds positioned on the cart based at least in part on the detected weight of the plurality of seeds and a known average weight of a seed of the plurality of seeds.

20. The method of claim 14, further comprising
determining when the cart is at a first position on the track;
determining the weight of the plant matter within the cart when the cart is at the first position on the track;
determining when the cart is at a second position on the track that is different than the first position; and
determining the weight of the plant matter within the cart at the second position.

* * * * *